United States Patent [19]

Borzym

[11] 4,228,706
[45] Oct. 21, 1980

[54] SWINGING RAM CUT-OFF MACHINE
[75] Inventor: John J. Borzym, Birmingham, Mich.
[73] Assignee: Alpha Industries, Inc., Novi, Mich.
[21] Appl. No.: 715,559
[22] Filed: Aug. 18, 1976
[51] Int. Cl.³ .......................... B26D 7/26; B23D 25/06
[52] U.S. Cl. .......................................... 83/320; 83/530
[58] Field of Search ........................... 83/530, 319, 320

[56] References Cited
U.S. PATENT DOCUMENTS

| | | | |
|---|---|---|---|
| 3,111,054 | 11/1963 | Tishken | 83/320 |
| 3,288,011 | 11/1966 | Borzym | 83/319 X |
| 3,288,012 | 11/1966 | Borzym | 83/319 X |
| 3,340,756 | 9/1967 | Mize | 83/320 |

Primary Examiner—J. M. Meister
Attorney, Agent, or Firm—Krass & Young

[57] ABSTRACT

An improved flying cut-off machine is disclosed of the type in which a ram is supported for swinging movement induced by a ram actuating mechanism so as to operate a cut-off die set to cut off lengths from an elongated workpiece continuously emanating from a tubing mill. The improvement comprises the provision of an adjustment member included in the ram actuating mechanism which is interposed between connecting rod end members, one of which is pivotally connected to a motor driven crank and the other pivotally connected to the swinging ram. The adjustment member comprises a shaft having oppositely threaded ends threaded into the connecting rod ends so that a length adjustment can be made to the connecting rod, which in turn provides a simultaneous adjustability feature to both the vertical stroke and shut height of the ram produced by the crank rotation so as to adapt the apparatus to variously configured die sets having differing shut heights and strokes.

24 Claims, 8 Drawing Figures

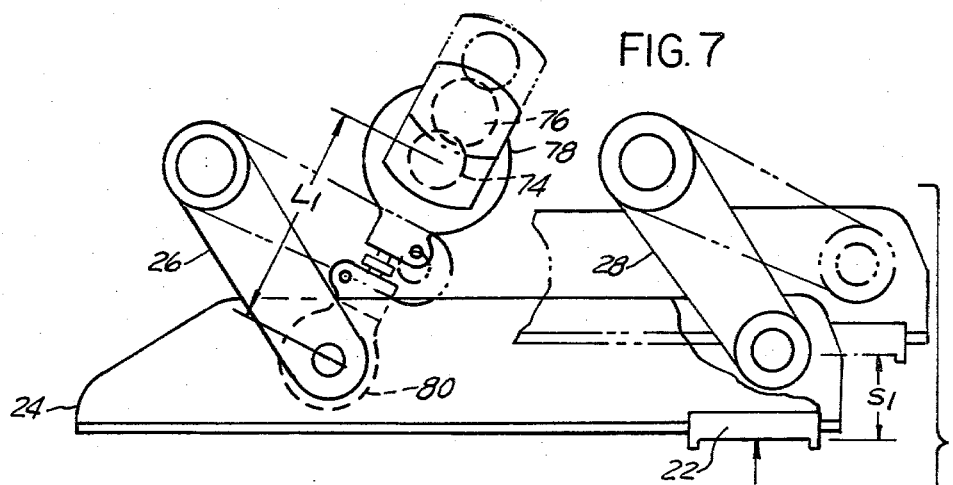
FIG. 7
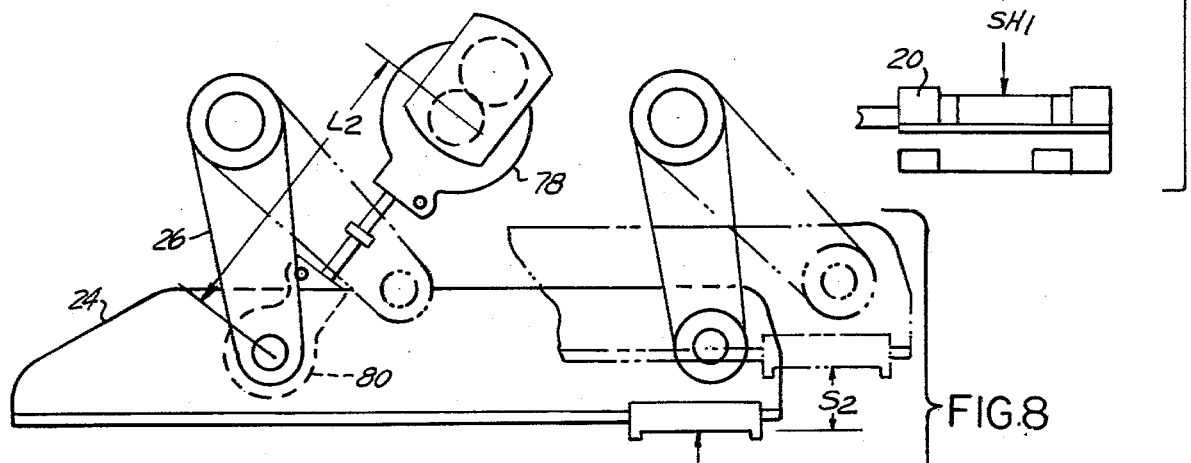
FIG. 8
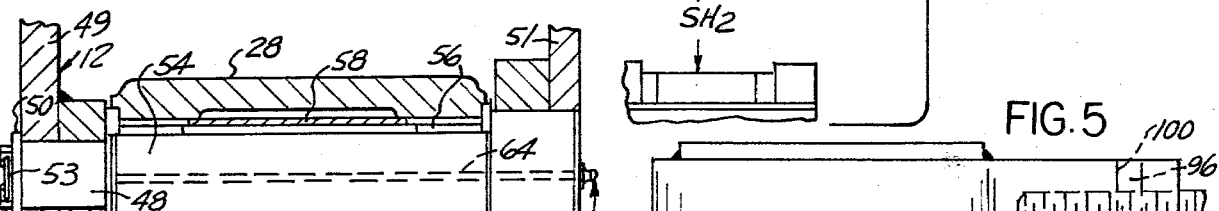
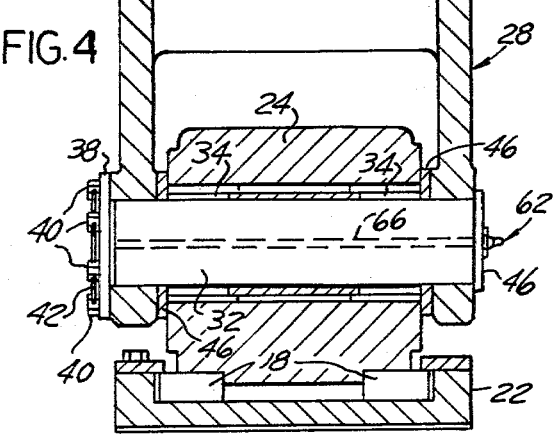
FIG. 4
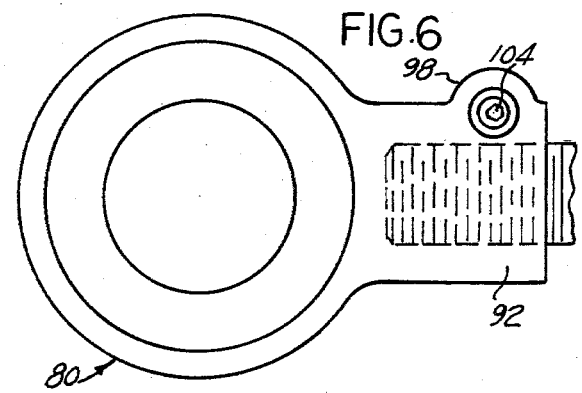
FIG. 5
FIG. 6

SWINGING RAM CUT-OFF MACHINE

BACKGROUND OF THE INVENTION

1. Field of the Invention

This invention concerns cut-off machine for mills which produce continuously emanating elongated workpieces of constant cross-section, such as welded tubing, and more particularly concerns cut-off machines of the type in which a cut-off die set is caused to be operated during traversing movement with the workpiece as it emanates from the tubing mill.

2. Description of the Prior Art

The so called ram type flying cut-off machines have enjoyed considerable success, since the precision ways and other complicated costly structure required in alternate approaches to this problem are greatly simplified or eliminated while reliability is improved an maintenance requirements reduced.

Similarly the associated controls are considerably reduced in complexity since a common drive comprising a rotary crank produces both the clamping chuck and cut-off blade stroking movement.

One example of one of these machines is described in detail in U.S. Pat. No. 3,288,011 and includes a ram which is supported on a machine frame by means of a plurality of links pivotally connected to the machine frame at their upper ends and pivotally connected to the ram at their lower ends which links thereby provide for to and fro reciprocation or "swinging" movement of the ram back and forth through an arcuate path in a plane parallel with respect to the longitudinal axis of the machine. The ram carries upper rails retaining an upper carriage for mounting of the cut-off die set while lower pairs of rails are disposed beneath the ram affixed to the machine frame slidably carrying the lower carriage support for mounting of the cut-off die set. The ram is caused to swing on the links by an actuating mechanism including a rotary crank drivingly connected to the ram by means of a connecting rod so that rotation of the crank arm produces "swinging" movement of the ram. Upon downward movement of the ram moving in its arcuate path a distance sufficient to actuate a cam means which operates the chuck jaws to engage the workpiece, the die set is clamped to the moving workpiece and thereby traversed along the rails therewith. The swinging movement of the ram also produces reciprocation of the cut-off blade after the chuck jaws have engaged the workpiece to sever the particular length of the workpiece. Continued rotation of the crank produces a return swinging movement of the ram, causing a withdrawal of the cut-off blade and unchucking of the workpiece, releasing the die set from the workpiece, after which the die set is returned to the start position by a carriage return mechanism.

The great advantage of this approach notwithstanding, a drawback was nevertheless entailed in the adoption of these designs in that the variability of the shut height, i.e., the position of the ram with respect to the lower support rails at the lowest position of the ram, was not adjustable as it was in some alternative approaches. This lack of adjustability limited the use of die sets requiring different strokes or shut heights in such machines, since some variation in the design of die sets exists. These variations result from the fact that die set designs typically originate from various sources, i.e. various machine manufacturers, tubing mill operators, etc. Also, die set designers sometimes assume some adjustability of the cut-off machine stroke and shut height can be made. The significance of the shut height of the ram is in its relationship to the blade position at its downwardmost position. In some cases the lack of adjustability would produce a blade position extending beyond the cut-off point, which reduces blade life and increases power requirements due to the unnecessary engagement of the blade with the stock. In other cases, particularly for workpiece cross-sections other than tubular, the correct blade position is essential to proper operation of the die set, necessitating shimming or some other modification of the die set in order to render it usable in this type of machine.

The use of adjustability features in the die set itself have in the past been provided, and can correct for some differences in shut height, but the difference in stroke would remain uncorrected.

In other ram support configurations in which the ram is orbited entirely about the link supports stroke increases and decreases would produce inverse decreases and increases in shut heights, which relationship is converse to the adjustments which would be desired, i.e., greater strokes would normally require greater shut heights.

Accordingly, it is an object of the present invention to provide a swinging ram cut-off machine in which adjustability of both the ram stroke and shut height is provided in which both the stroke and shut height may be adjusted so as to vary concurrently, i.e. an increase in strokes will be produced simultaneously with an increase in shut heights, so that a machine may be simply and quickly adapted to die sets which operate with a range of strokes and shut heights.

SUMMARY OF THE INVENTION

This and other objects which will become apparent upon a reading of the following specification and claims is accomplished by the provision of means for selectively adjusting the movement of the ram to shift the arc of movement to a particular selective segment of the arcuate path through which the ram may swing on the links. This adjustability is provided by a length adjustability in the connecting rod means produced by a connecting rod adjusting member interposed between respective upper and lower connecting rod ends, the upper connecting rod end pivotally connected to the crank eccentric and the lower connecting rod end pivotally connected to the ram, with changes in the length of the connecting rod means producing resultant changes in stroke and shut height such that reductions in the shut height are produced concurrently with reductions in stroke. The connecting rod adjusting member comprises a shaft having oppositely threaded ends received into corresponding threaded bores formed in the upper and lower connecting rod ends respectively, with a slot formed in each of the rod ends into the threaded bores, and means provide adapted to draw together the bore segments formed by the slots to lock the adjusting member in any adjusted position.

DESCRIPTION OF THE DRAWINGS

FIG. 4 is a view of the section taken along line 4—4 in FIG. 1;

FIG. 5 is a plan view of the lower connecting rod end shown in FIG. 1;

FIG. 6 is a front elevational view of the lower connecting rod end shown in FIG. 5;

FIG. 7 is a diagrammatic representation of a stroking of the ram mechanism with a length adjustment $L_1$;

FIG. 8 is a diagrammatic representation of a ram cycle with an exaggeratedly longer connecting rod length $L_2$ depicting the effect on ram stroke and shut height of adjustments of the connecting rod length.

DETAILED DESCRIPTION

In the following detailed description certain specific terminolgy will be utilized and a particular embodiment described for the sake of clarity in accordance with requirements of 35 USC 112, but it should be understood that the same is merely for explanatory purposes and the inventive concept is susceptible of a wide variety of manifestations within the scope of the concept.

Figure 1:
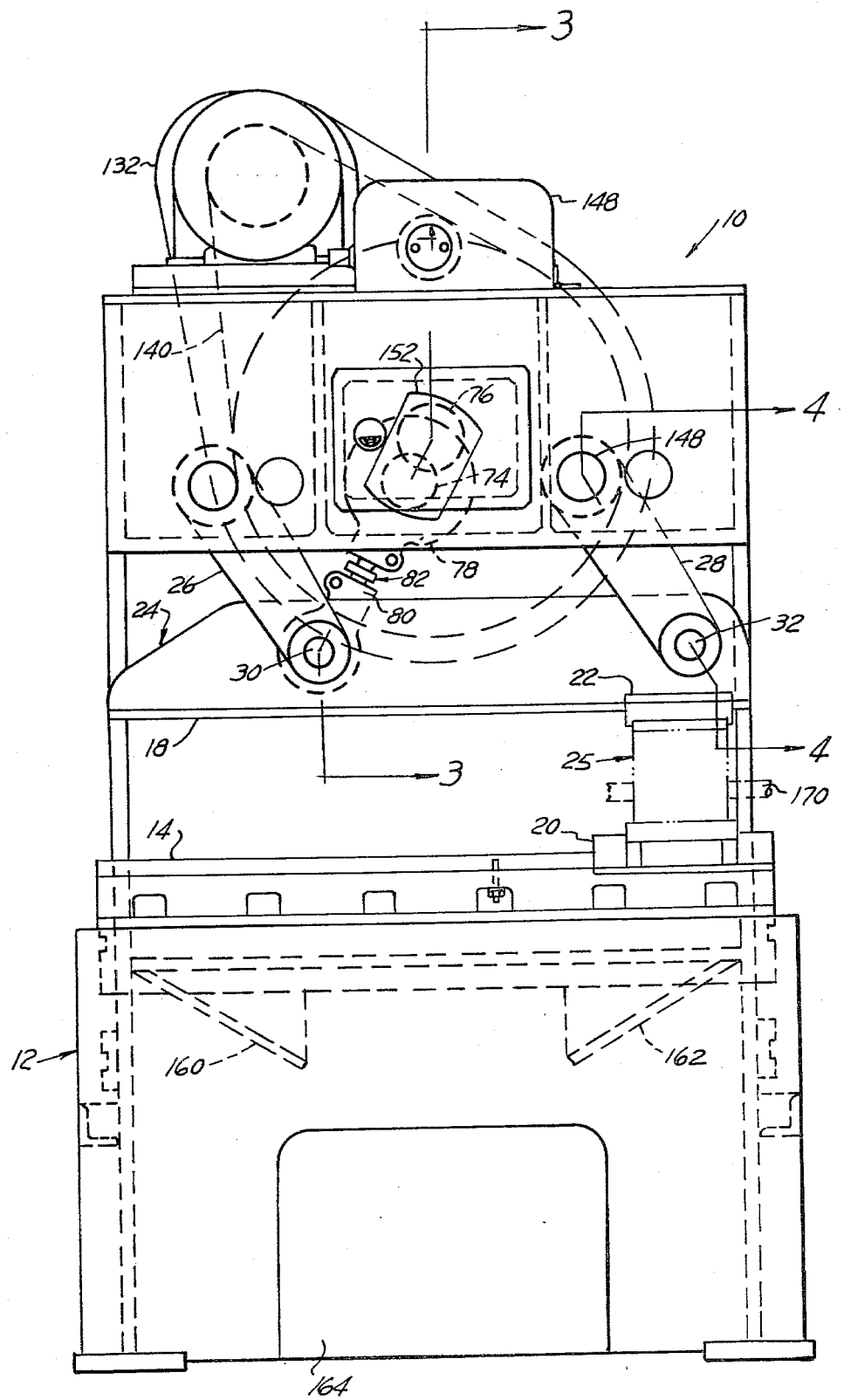
FIG. 1 is a side elevational view of the swinging ram cut-off apparatus depicted in FIG. 1.
Figure 2:
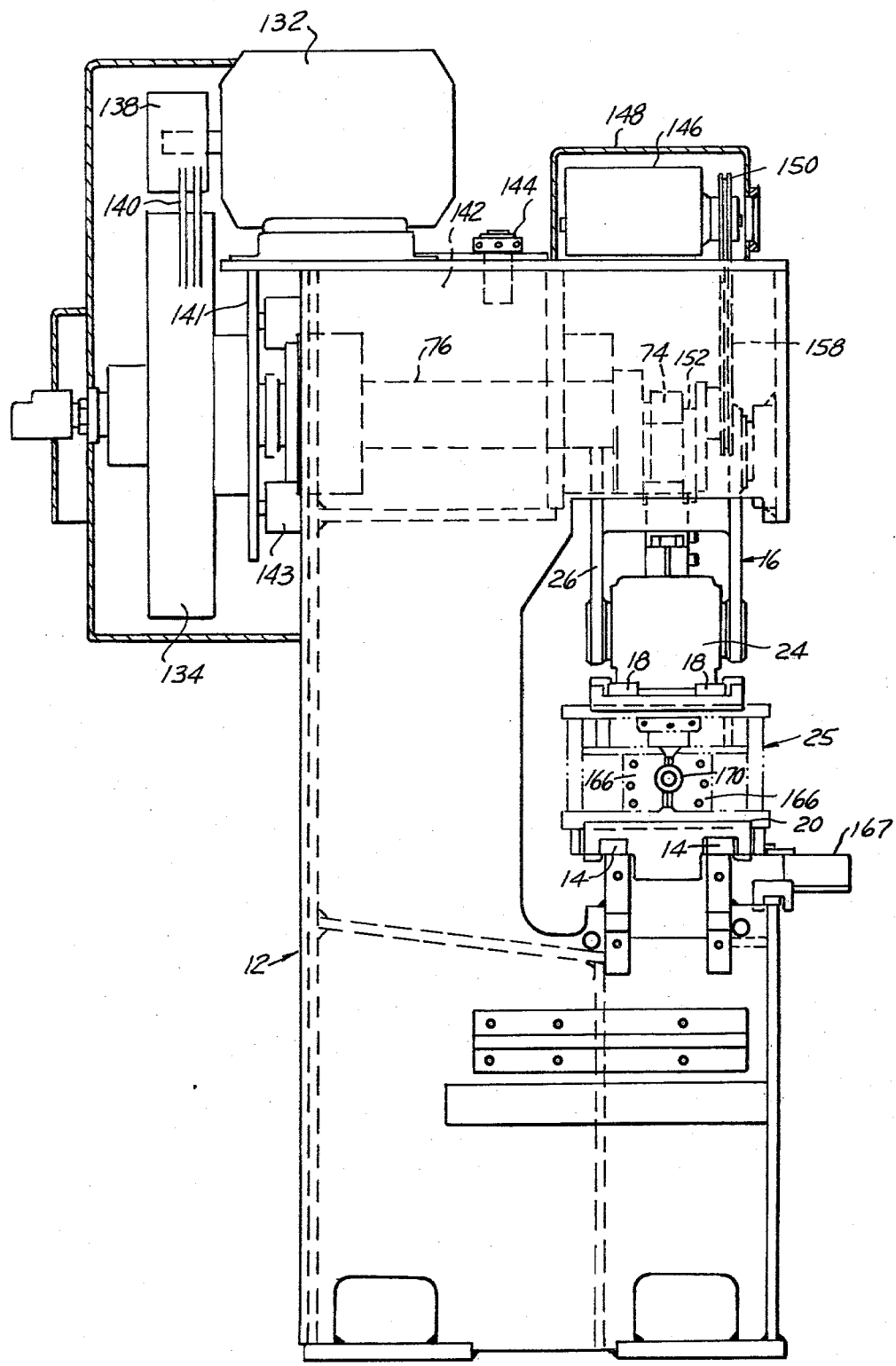
FIG. 2 is a front elevational view of the apparatus depicted in FIG. 1.

Referring then to the drawings, particularly FIGS. 1-6, a swinging ram cut-off machine 10 of the type incorporating the improvement of the present invention is depicted, which including a machine base or frame 12, which may be provided by a suitably fabricated weldment. The machine frame 12 as seen in FIG. 2 has a generally C-shaped configuration in section so as to provide a support for both a set of lower rails 14 and for a ram mechanism identified generally in FIG. 2 as item 16. The lower rails 14 in turn slidably retain a lower die set carriage 20.

The swinging ram mechanism 16 includes a set of upper rails 18 slidably retaining an upper die set carriage 22. Each of the upper and lower die set carriages 20 and 22 are slidable in their respective rail sets 18 and 14 along the longitudinal length of the machine as described in the aforementioned U.S. Pat. No. 3,288,011 so that a die set 25 mounted therein may be carried along by the workpiece when clamped thereto during the severing of the workpiece.

The upper rail set 18 is affixed to a ram 24 which is swingably supported on the machine frame 12 so as to move to and fro through an arcuate path over the lower rails 14 in a plane parallel to the longitudinal axis of the machine by means of a plurality of links, in this embodiment shown as a pair of links 26 and 28.

Figure 3:
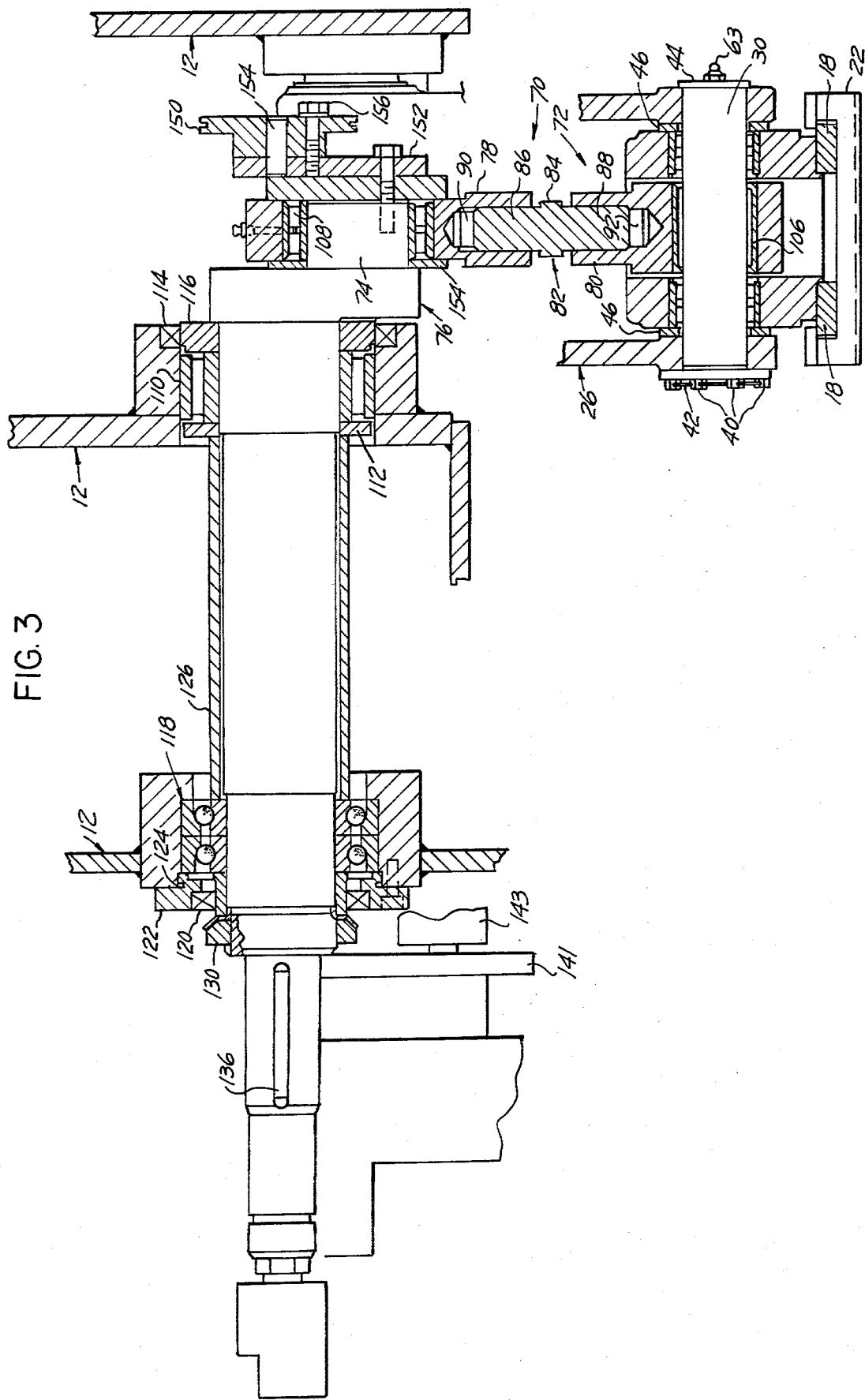
FIG. 3 is a view of the section taken along the lines 3—3 in FIG. 1.

Each link 26 and 28 is bifurcated as depicted in FIGS. 3 and 4 respectively so as to provide a pivotal connection to the ram 24 by means of lower link pins 30 and 32 each passing through both a section of the ram 24 and the bifurcated portion of its associated link to provide such pivotal support. Appropriate spaced bearing sets 34 are provided for this purpose. Each link pin 30 and 32 is retained by means of retainer plates 36 and 38 secured by a series of hex cap screws 40 secured by back straps 42 and cooperating with the respective shoulders 44 and 46 formed on the lower link pins 30 and 32 respectively.

The upper ends of connecting links 26 and 28 are both pivotally supported on the machine base 12 in similar fashion to each other. Accordingly, the mode of support for the link 28 is depicted in detail in FIG. 4, it being understood that the link 26 is supported in the same way. This arrangement includes an upper link pin 48 secured to a pair of steel plates 49 and 51, which form a part of the machine base 12, by means of a retainer 50 secured by means of hex screws 52, in turn retained by a backstrap 53. A pair of spaced bearings 54 and 56 provide rotatable support of the link 28 on the upper link pin 48 with a bearing spacer 56 provided as well.

A series of grease fittings 60, 62 and 63 are provided cooperating with internal passages 64, 66 and 67 formed in pins 48, 32 and 30 respectively.

The ram is caused to swing or oscillate on the links 26 and 20 by means of a ram actuating mechanism generally referred to as 70 in FIG. 3. The ram actuating mechanism 70 would include a connecting rod means 72 pivotally connected at its lower end to the ram 24 by virtue of being rotatably supported on the lower link pin 30 at its lower end, and also includes means for moving the connecting rod means so as to swing the ram. This means is here provided by the upper end of the connecting rod means being pivotally mounted on an eccentric 74 of a rotatable crank shaft 76.

The connecting rod means 72 includes an upper connecting rod end 78 and a lower connecting rod end 80 interconnected by means for adjusting the effective length of the connecting rod means 72 here taking the form of a connecting rod adjusting screw 82. The connecting rod adjusting screw 82 is provided by a shaft having a central wrenching surface 84 formed thereon with an oppositely threaded upper portion 86 and lower portion 88, threadedly received within threaded bores 90 and 92 respectively formed in the upper and lower connected rod ends 78 and 80. The position of the connecting rod adjusting screw 82 within each of the respective connecting upper and lower connecting rod ends 78 and 80 is securely maintained by means of a slotted section formed through the side wall formed by the threaded bores 90 and 92 respectively.

This arrangement is shown in FIGS. 5 and 6 which show the lower connecting rod end 80 which is typical of both the upper and lower connecting rod ends 78 and 80 and includes a slot at 94 with bore 96 formed transversely thereto with a protuberance 98 provided to accommodate the bore 96. The bore 96 is threaded at 100 on one side of the slot 94 and counterbored at 102 on the other side of the slot 94 so as to receive a socket head screw 104 which is adapted to be threaded into the threaded portion 100 and to secure the connecting rod adjusting screw 82 in any given adjusted position.

The lower connecting rod end 80 is pivotally supported on the link pin 30 by means of a bearing 106 while the upper connecting rod end 78 is supported on the eccentric 74 by means of a roller bearing 108. The crank shaft 76 in turn is rotatably supported in the machine frame 12 by means of a roller bearing 110 with a thrust washer 112, seal 114 and thrust washer 116 being also provided. The crank shaft 76 is supported at its other end in ball bearing set 118 being similarly provided with an oil seal 120 bearing retainer 122 and O-ring 124 with the axial position of the crank shaft 76 being maintained by means of a spacer tube 126 cooperating with a second spacer tube 128 and a locking washer 130 threaded onto a shoulder of a crank shaft 76.

The crank shaft 76 is adapted to be rotated by means of an electric motor 132 rotating a clutch-brake mechanism 134 (FIG. 2) having an output member (not shown) adapted to be keyed at 136 to an extension of the crank shaft 76, the electric motor being drivingly connected via a pulley 138 and belt arrangement 140. The clutch-brake mechanism 134 is positioned with respect to the crank shaft 76 by means of a spacer plate 141 secured to the machine frame 12 by posts 143 and is adapted to be activated by the central system to cause rotation of the crank shaft 76 at appropriate points in the machine cycle.

Control of the electric motor 132 and clutch-brake mechanism 134 is carried out in cooperation with a rotary limit switch 146 positioned in a cover 148 on the upper portion of the machine frame 12 with encoding information of the angular position of the crank shaft 76 being transmitted by means of a pulley wheel 150 secured concentrically to the end portion of the crank shaft 76 on a retainer plate 152 which also serves to retain the connecting rod link 178 thereon in cooperation with the spacer 154. The encoder information is transmitted by virtue of the doweling at 154 and machine screws 156 to the eccentric wheel 150, with a precision chain connection 156, 158 effectively transmitting accurately the angular position of the crank shaft 76.

Since the controls of machines of this type are well known and do not form a part of the present invention, details of the same are not here included.

The upper plates in said machine frame 12 may form a lubricant reservoir 142 so that a breather 144 is provided.

Collector plates 160 and 162 may be provided to direct the sheared stock material towards a cut-out 164 provided in the machine frame 12 which is provided so that a collecting container (not shown) may be disposed therein.

In use, the machine as depicted in its essentials is well known and a detailed description will not be here included. Suffice it to say that the control system (not shown), which may be interrelated with the mill controls, causes activation of the clutch-brake mechanism 134, in turn producing rotation of the crank shaft 76 and attached eccentric 74. This rotation in turn produces movement of the connecting rod means 72 to produce a swinging movement causing the ram to move forwardly or to the left as viewed in FIG. 1 and downwardly as viewed therein. As is disclosed in detail in the aforementioned U.S. Pat. No. 3,288,011 this downward movement operates a pair of chuck jaws by cams (not shown) which chuck jaws 166 are adapted to grip the workpiece securely so that the die set 25 is carried along the upper and lower rails 14 and 18 with the workpiece 170. Further downward movement of the ram 24 causes operation of the cut-off blade 172. Upon continued rotation of the crank shaft 76 of the ram 24, movement is reversed, with upward movement causing withdrawal of the blade 172 and subsequently release of the chuck jaws, all of this taking place before the die set 25 has reached the end of travel on the upper and lower rails 14 and 18. The die set 25 secured to the upper and lower carriages 20 and 22 respectively is then returned by means of a hydraulic or pneumatic cylinder (not shown) to the initial position upon its release with a limit switch 167 assembly being provided to provide a signal indicative of the actual position of the die set on the upper and lower rails 14 and 18.

Referring to FIGS. 7 and 8, the effect on the swinging movement of the ram 24 by changes in the length of connecting rod 72 can be seen. In FIG. 7 the connecting rod means 72 length is identified as the length $L_1$, which in the lowermost position as depicted in FIG. 7 produces a shut height equal to or depicted as $S.H._1$. The uppermost position of the links 26 and 28 is depicted in phantom, with the difference in relative heights being equal to the vertical stroke distance or $S_1$. Referring to FIG. 8 in which the connecting rod means length L has been exaggeratedly increased to that depicted as $L_2$, it can be readily seen that both the shut height $SH_2$ and the stroke $S_2$ have been considerably shortened so that by a single adjustment both the stroke and the shut height can be adjusted to suit the particular die set being utilized without the need for disassembly of the machine or replacement of parts or custom manufacture of parts, etc. This effect is produced by the geometric interrelationship between the links 26 and 28, the connecting rod means 72 and the crank shaft 76 since as the ram 24 moves through the arcuate path produced by support on the links 26 and 28, a given angular movement of the links 26 and 28 produces a smaller corresponding downward travel in positions along the arcuate path approaching the full down position. Thus even though the angular rotation of the links 26 and 28 produced by the crank shaft 76 rotation may increase with increasing connecting rod means lengths, the vertical travel of the ram 24 and therefore the ram stroke is reduced. This with a concurrent decrease in the shut height with increasing connecting rod means lengths, since the position of the links 26 and 28 becomes more and more extreme with such increases in length. It thus can be appreciated that in effect the adjustment to the connecting rod means 76 length allows the usage of various segments of the arcuate path defined by the swinging movement of the links 26 and 28. That is, it allows the machine user to shift the arc of movement to utilize various portions of the swinging movement to custom fit the output motion of the ram 24 to the particular die set requirements thus alleviating the problem referred to above in which varying die set sizes and designs may be optimized and indeed a wider application of a given machine to various die sets is thereby rendered possible.

As noted above, many variations in the mechanical details of the implementaion of this concept are of course possible and the inventive concept should not be construed as being limited to the specifics here disclosed.

The embodiments of the invention in which an exclusive property or privilege is claimed as follows:

1. In a cut-off machine for severing lengths from an elongated workpiece while said workpiece is in motion, said cut-off machine being of the type adapted to operate a cut-off die set and support said cut-off die set for sliding movement while engaged with said workpiece, said machine including a die set operating ram, means supporting said ram for arcuate swinging movement in a plane parallel to said line of movement of said workpiece and die set, said machine also including a ram actuating mechanism for swinging said ram on said means supporting said ram for swinging movement, the improvement wherein said actuating mechanism includes adjustment means for selectively shifting the segment of said arcuate path through which said ram is caused to swing, whereby the vertical stroke and downmost position of said ram may thereby be adjusted.

2. The cut-off machine according to claim 1 wherein said actuating mechanism includes connecting rod means pivotally connected to said ram, and means for moving said connecting rod means to cause said movement of said ram.

3. The cut-off machine according to claim 2 wherein said adjustment means includes means for adjusting the length of said connecting rod means whereby said segment of said arcuate path through which said ram swing is thereby shifted.

4. The cut-off machine according to claim 3 wherein said means moving said connecting rod means includes a crank shaft having an eccentric pivotally connected to said connecting rod means and further includes means for rotating said crank shaft to thereby produce said movement of said connecting rod means.

5. The cut-off machine according to claim 1 wherein said means supporting said ram for arcuate movement includes a machine frame, a plurality of links each pivotally connected at one end to said ram and at the other end to said machine.

6. The cut-off machine according to claim 3 wherein said connecting rod means includes an upper connecting rod end and a lower connecting rod end and wherein said means for adjusting the length of said connecting rod means includes an adjustment member connecting said upper and lower connecting rod ends.

7. The cut-off machine according to claim 6 wherein said adjustment member comprises a shaft having oppositely threaded portions at each end thereof, and wherein said adjustment means includes a threaded opening in each of said upper and lower connecting rod ends receiving a respective end of said adjustment member.

8. The cut-off machine according to claim 7 wherein said adjustment member includes a wrench surface formed intermediate said threaded end portions.

9. The cut-off machine according to claim 7 wherein said threaded openings are formed with a slot therethrough and further including means for drawing together said split portions formed by said slots to thereby secure said adjustment member in the adjusted position.

10. The cut-off machine according to claim 5 wherein said actuating mechanism includes connecting rod means pivotally connected to said ram, and means for moving said connecting rod means to cause said swinging movement of said ram on said plurality of pivotal links.

11. The cut-off machine according to claim 10 wherein said adjustment means includes means for adjusting the length of said connecting rod means whereby said segment of said arcuate path through which said ram swings on said plurality of links is thereby shifted.

12. The cut-off machine according to claim 11 wherein said means moving said connecting rod means includes a crank shaft having an eccentric pivotally connected to said crank shaft to thereby produce said movement of said connecting rod means.

13. The cut-off machine according to claim 12 wherein said connecting rod means includes an upper connecting rod end and a lower connecting rod end and wherein said means for adjusting the length of said connecting rod means includes an adjustment member connecting said upper and lower connecting rod ends.

14. The cut-off machine according to claim 13 wherein said adjustment member comprises a shaft having oppositely threaded portions at each end thereof, and wherein said adjustment means includes a threaded opening in each of said upper and lower connecting rod ends receiving a respective end of said adjustment member.

15. The cut-off machine according to claim 14 wherein said adjustment member includes a wrenching surface formed intermediate said threaded end portions.

16. The cut-off machine according to claim 15 wherein said threaded openings are formed with a slot therethrough and further including means for drawing together said split portions formed by said slots to thereby secure said adjustment member in the adjusted position.

17. A cut-off machine for cutting off lengths of an elongated workpiece being advanced therethrough comprising:
  a machine frame;
  a set of lower rails secured to said frame extending along a longitudinal axis of said machine;
  a ram;
  means supporting said ram on said machine frame for swinging movement over said lower rails, said means including a plurality of links, each of said links pivotally supported at one end on said machine frame and pivotally connected at the other end to said ram;
  upper rails affixed to said ram opposite and parallel to said lower rails;
  an upper carriage slidably retained in said upper rails;
  a lower carriage slidably retained in said lower rails;
  a cut-off die set carried by said upper and lower carriages including workpiece engaging chuck jaws and cam means operated by descending movement of said ram to cause said chuck jaws to engage said workpiece and further including a cut-off blade and means for causing said blade to descend through said workpiece while said chuck jaws engage said workpiece, said means including a driving connection with said ram;
  a ram actuating mechanism for causing said ram to swing on said machine frame about said pivotal supports for said plurality of links to thereby operate said die set, said actuating mechanism including adjustment means for selectively shifting the segment of said arcuate path through which said ram is caused to swing, whereby the vertical stroke and downmost position of said ram may thereby be adjusted.

18. The cut-off machine according to claim 17 wherein said actuating mechanism includes connecting rod means pivotally connected to said ram, and means for moving said connecting rod means to cause said movement of said ram.

19. The cut-off machine according to claim 18 wherein said adjustment means includes means for adjusting the length of said connecting rod means whereby said segment of said arcuate path through which said ram swings is thereby shifted.

20. The cut-off machine according to claim 19 wherein said means moving said connecting rod means includes a crank shaft having an eccentric pivotally connected to said connecting rod and further includes means for rotating said crank shaft to thereby produce said movement of said connecting rod means.

21. The cut-off machine according to claim 20 wherein said connecting rod means includes an upper connecting rod end and a lower connecting rod end and wherein said means for adjusting the length of said connecting rod means includes an adjustment member connecting said upper and lower connecting rod ends.

22. The cut-off machine according to claim 21 wherein said adjustment member comprises a shaft having oppositely threaded portions at each end thereof, and wherein said adjustment means includes a threaded opening in each of said upper and lower connecting rod ends receiving a respective end of said adjustment member.

23. The cut-off machine according to claim 22 wherein said adjustment member includes a wrenching surface formed intermediate said threaded end portions.

24. The cut-off machine according to claim 23 wherein said threaded openings are formed with a slot therethrough and further including means for drawing together said split portions formed by said slots to thereby secure said adjustment member in the adjusted position.

* * * * *